(12) United States Patent
Thompson et al.

(10) Patent No.: US 8,108,013 B2
(45) Date of Patent: Jan. 31, 2012

(54) SYSTEMS AND METHODS FOR MANAGING POWER CONSUMPTION IN A FLOW-BASED USER EXPERIENCE

(75) Inventors: Timothy J. Thompson, Kyle, TX (US); Howard D. Owens, Austin, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 691 days.

(21) Appl. No.: 11/956,240

(22) Filed: Dec. 13, 2007

(65) Prior Publication Data

US 2009/0156270 A1   Jun. 18, 2009

(51) Int. Cl.
*H04B 1/38* (2006.01)
*H04B 1/16* (2006.01)

(52) U.S. Cl. .................. 455/574; 455/343.1; 455/343.2; 455/343.6

(58) Field of Classification Search .................. 455/574, 455/343.5, 571, 343, 1, 412.1, 566, 567
See application file for complete search history.

(56) References Cited

U.S. PATENT DOCUMENTS

| | | | |
|---|---|---|---|
| 7,016,704 B2 * | 3/2006 | Pallakoff ........................ | 455/566 |
| 7,017,053 B2 | 3/2006 | Mizuyabu et al. | |
| 7,080,267 B2 | 7/2006 | Gary et al. | |
| 7,647,042 B2 * | 1/2010 | Willey ........................... | 455/421 |
| 7,661,004 B2 * | 2/2010 | May et al. ..................... | 713/323 |
| 7,676,249 B2 * | 3/2010 | Willey ........................... | 455/567 |
| 7,684,833 B2 * | 3/2010 | Marschalkowski et al. .. | 455/574 |
| 7,724,696 B1 * | 5/2010 | Parekh .......................... | 370/311 |
| 7,734,317 B2 * | 6/2010 | Patel et al. .................... | 455/572 |
| 7,765,419 B2 * | 7/2010 | Fuccello ........................ | 713/324 |
| 7,925,298 B2 * | 4/2011 | Chen et al. ................... | 455/556.1 |
| 2004/0185918 A1 * | 9/2004 | Fan et al. ....................... | 455/574 |
| 2004/0198468 A1 * | 10/2004 | Patel et al. ..................... | 455/574 |
| 2004/0204183 A1 * | 10/2004 | Lencevicius et al. .......... | 455/574 |
| 2005/0124389 A1 * | 6/2005 | Yang .............................. | 455/574 |
| 2005/0250557 A1 * | 11/2005 | Marschalkowski et al. .. | 455/574 |
| 2006/0114267 A1 | 6/2006 | Park | |
| 2006/0121955 A1 * | 6/2006 | Shlomot ........................ | 455/574 |
| 2007/0159425 A1 | 7/2007 | Knepper et al. | |
| 2007/0183678 A1 | 8/2007 | Sankar et al. | |
| 2007/0192641 A1 | 8/2007 | Nagendra et al. | |
| 2007/0273714 A1 | 11/2007 | Hodge et al. | |
| 2007/0287511 A1 * | 12/2007 | Koivunen et al. ............. | 455/574 |
| 2009/0054100 A1 * | 2/2009 | Ishida ........................... | 455/556.1 |

OTHER PUBLICATIONS

Flautner, K., et al., Vertigo: Automatic Perforamnce-Setting for Linux, OSDI '02: Proceedings of the 5th symposium on Operating systems design and implementation, pp. 105-116, Winter 2002.
International Search Report PCT/US2008/085230 dated May 29, 2009.

* cited by examiner

*Primary Examiner* — Tilahun B Gesesse

(57) ABSTRACT

Methods and systems are provided for managing electrical power consumption in a mobile phone or other portable communications device having a battery and a display. A series of views forming a flow are retrieved from a memory or other digital storage device for presentation on the display. For each of the views in the flow, performance information relating to the portable communications device is determined while the view is displayed, and this information is stored in the digital storage medium. Upon subsequent retrieval of each view from the digital storage medium, configuring the operation of the portable communications device in response to the stored performance information to thereby manage the electrical power consumption of the portable communications device.

18 Claims, 4 Drawing Sheets

SYSTEMS AND METHODS FOR MANAGING POWER CONSUMPTION IN A FLOW-BASED USER EXPERIENCE

TECHNICAL FIELD

The present invention generally relates to power management for mobile phones and other portable communications devices, and more particularly relates to power management using software features in a portable device.

BACKGROUND

Consumers are increasingly relying upon mobile communications to stay connected to business associates, family members, friends and others. Cellular and other mobile phones have become commonplace, as have personal digital assistants (PDAs) and other devices that increasingly provide digital or analog communications capabilities. Consumers now rely on many types of portable devices for not only telephone communications, but also internet access, email, text messaging, location based services and other features.

As a result, many portable communications devices now include displays capable of presenting web pages and other graphical imagery, as well as input devices such as keyboards and/or touch sensors that allow sophisticated user inputs. The additional features now available on many devices, however, can demand relatively large amounts of electrical power in comparison to older devices. Unfortunately, battery technology has not allowed power supplies to keep up with the increased demands, thereby resulting in shorter battery life and/or reduced performance for many devices. That is, a tradeoff generally exists between battery life and device performance; conserving battery life typically involves reducing the performance of the device, whereas increasing performance typically involves reducing the useful time that the device can be used until the battery needs to be recharged.

Thus, it is desirable to create systems and techniques that reduce power consumption in a portable communications device. Such systems and techniques would ideally be able to improve power consumption without significant adverse effects upon the end user perception of the performance of the device. Other desirable features and characteristics will become apparent from the subsequent detailed description and the appended claims, taken in conjunction with the accompanying drawings and this background of the disclosure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages of the various embodiments of the present invention.

Figure 1:
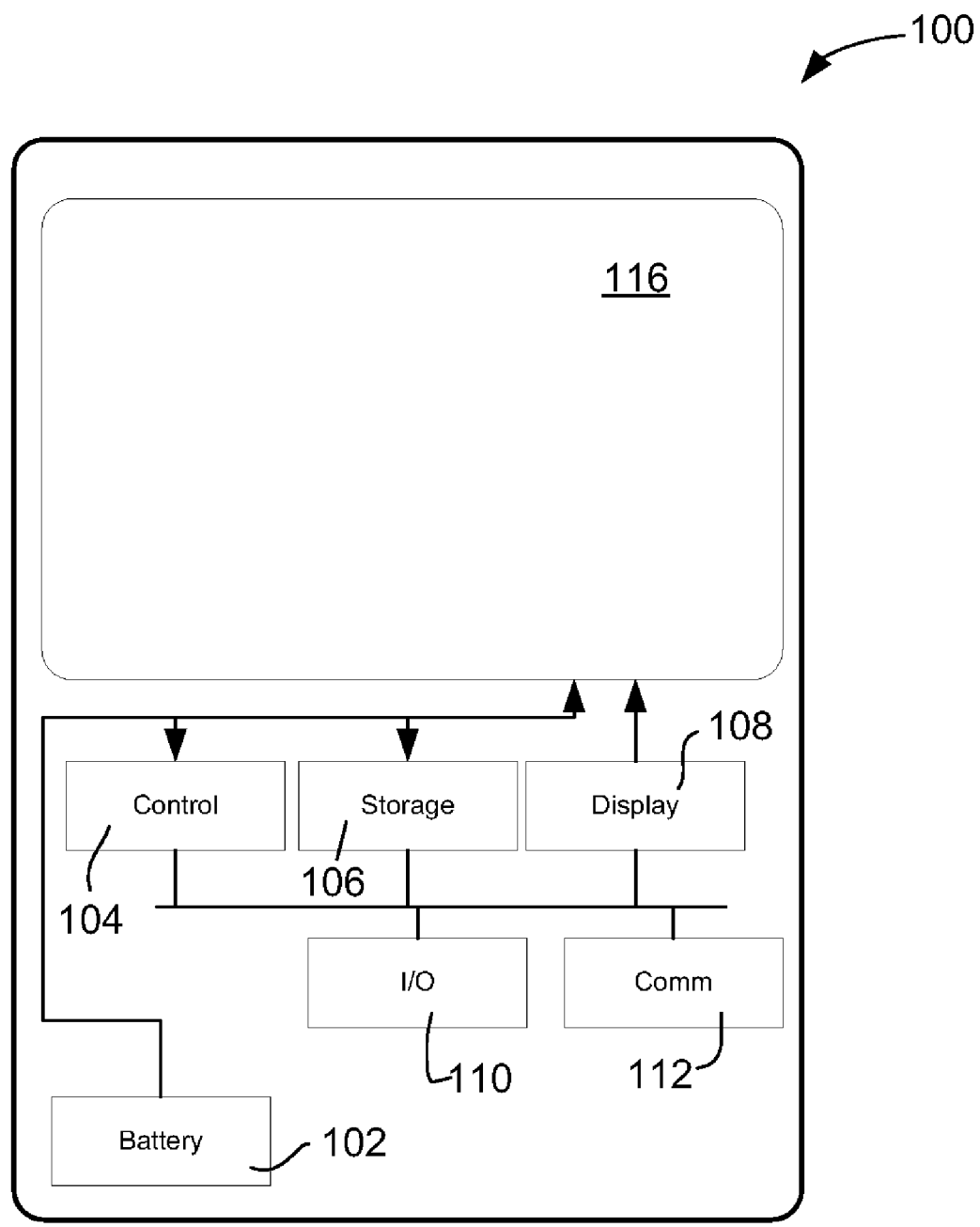
FIG. 1 is a block diagram of an exemplary mobile communications device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION

The following description of the invention is merely exemplary in nature and is not intended to limit the invention or the application and uses of the invention. Furthermore, there is no intention to be bound by any theory presented in the preceding background of the invention or the following detailed description of the invention.

In various embodiments, power management in a mobile phone or other portable device can be improved through clever use of new software design techniques and structures. Whereas many portable devices historically operated using conventional programming models wherein relatively static applications interacted with a user interface subsystem, newer devices can be built upon flow-based models wherein the user is presented with a connected series of views that make up a flow. A flow completes a basic task for a user. In the flow-based model, an experience player application "plays" a flow by completing transitions between displayed views based upon inputs received.

Devices based upon flow models can therefore exploit new efficiencies to accurately monitor power consumption needed for effective operation, thereby allowing the device to configure future operation to reduce demands for excess power. By tracking performance information as a flow executes, for example, and storing information about that performance with the flow, operating parameters can be configured upon subsequent execution of the flow to provide for sufficient computing capability to preserve the user experience but without over-consuming battery power by enabling excessive unneeded resources. By configuring system performance (e.g. using conventional dynamic voltage and frequency scaling (DVFS) techniques) in response to performance information stored with the flow, power consumption in the device can be improved without significant adverse effects upon the user experience. That is, system performance can be tuned during subsequent execution of the flow to provide an adequate user experience, but without excessive resources that may otherwise consume unneeded battery power. As a result, the device consumes less power and/or enjoys a longer battery life, yet retains an acceptable experience for the user even as resources are being conserved.

In various embodiments, methods and systems are provided for managing electrical power consumption in a mobile phone or other portable communications device having a battery and a display. A series of views forming a flow are retrieved from a memory or other digital storage device for presentation on the display. For each of the views in the flow, performance information relating to the portable communications device is determined while the view is displayed, and this information is stored in the digital storage medium. Upon subsequent retrieval of each view from the digital storage medium, configuring the operation of the portable communications device in response to the stored performance information to thereby manage the electrical power consumption of the portable communications device.

In other embodiments, a system is provided for managing electrical power consumption in a portable communications device having a battery and a display. The system comprises a database storing a plurality of views, and a flow player. Each of the views is configured to produce an image on the display and has an associated data field configured for storing performance information about the performance of the portable communications device when the view is active. The flow player is configured to retrieve a series of the views from the database to thereby form a flow, to produce the image associated with each view on the display, to measure the performance information while each view is active and to store each view with the associated data fields in the database when the view is complete. In various further embodiments, the system further comprises a power management module configured to communicate with the flow player and to configure the portable communications device in response to the performance information associated with the current view to thereby manage electrical power consumption in the portable communications device.

In still other embodiments, a portable communications device is provided. A battery configured to provide electric power, and a user input device is configured to receive user inputs. A display is configured to receive a portion of the electric power from the battery, and a digital storage device is configured to receive a second portion of the electric power from the battery and to store a plurality of views, wherein each view comprises an image for presentation on the display. A controller is configured to receive a third portion of the electric power from the digital storage device and to present a series of views forming a flow on the display in response to user inputs received from the input device. The controller is further configured to determine performance information about the portable communications device while each view is active, to store the performance information with the view on the digital storage device, and, upon subsequent retrieval of the view from the digital storage device, to configure the portable communications device in response to the stored performance information to thereby manage the amount of electric power provided by the battery. These and other embodiments are described more fully below.

Turning now to the drawing figures and with reference to FIG. 1, an exemplary portable communications device 100 suitably includes a display 116 for presenting text and/or images to the user, a transceiver 112 that transmits and receives analog or digital signals using an antenna 114, and a controller 104 that controls the various functions of the portable communications device 100. Different types of portable communications devices include cellular and other wireless telephones, personal digital assistants (PDAs), global positioning systems (GPS), video game players, portable computers and/or the like.

Controller 104 is any hardware, software, firmware and/or other logic capable of directing the various features and functions of device 100. In various embodiments, controller 104 is a conventional microprocessor or microcontroller configured to operate with associated memory or other digital storage 106, input/output 110, display drivers 108 and/or the like. To that end, controller 104 typically executes software instructions to process user inputs received from input device 110 to communicate using transceiver 112 and/or to create desired results presented on display 116 as appropriate. Software instructions and data may be stored separately or together on any digital storage 116, which may be implemented with any sort of read only, random access, flash and/or other digital memory, or with any type of optical, magnetic and/or other mass storage.

Electric power for device 100 is provided by any sort of battery 102. In various embodiments, battery 102 is any source of stored energy, including any sort of nickel-cadmium (NiCad), nickel metal hydride (NiMH), lithium ion (Li-ion), lithion ion polymer, zinc bromide and/or other type of battery. Generally speaking, battery 102 provides a voltage between two terminals that can be coupled to various components of device 100 to supply energy to the components. In the exemplary embodiment shown in FIG. 1, for example, battery 102 is shown to provide power to controller 104, memory 106, and display 116, although any another components of device 100 could be similarly coupled to battery 102 as desired.

Although the battery voltage is relatively fixed during many operations, circuitry contained within device 100 can adjust the power consumed by the device at certain times. Reduced power consumption often comes, however, at the expense of lower performance settings such as lower frequencies of operation and/or the like. As described more fully below, certain techniques can be used to determine when voltage can be reduced due to reduced performance requirements. The electrical load on battery 102 is generally dependent upon, among other things, the number of modules or components in device 100 that are drawing current at any particular time, as well as the various operating parameters (e.g. operating frequency) of those components. Conserving the charge stored in battery 102, then, generally involves managing actions carried out within device 100 that can draw current from the battery. Actions that draw current from battery 102 may include, without limitation, operation of controller 104, retrieving data or instructions from memory 106, access to input/output devices 110, transmitting or receiving wireless signals with transceiver 112, and/or presenting imagery on display 116. Reducing or restricting these and other actions can significantly reduce the current demand placed on battery 102, which in turn can significantly increase the time that device 100 can be used until battery 102 needs to be recharged. A challenge often arises, however, in determining the amount of reduction, restriction and/or other management that can be applied without significantly affecting the experience of a person using device 100.

As noted above, power management can be improved through clever use of new software design techniques and structures. Flow-based programming models, for example, can take advantage of various efficiencies to accurately monitor power consumption needed for effective operation, thereby allowing the device to effectively configure future operation to provide an adequate user experience, but without consuming excessive battery power.

Figure 2:
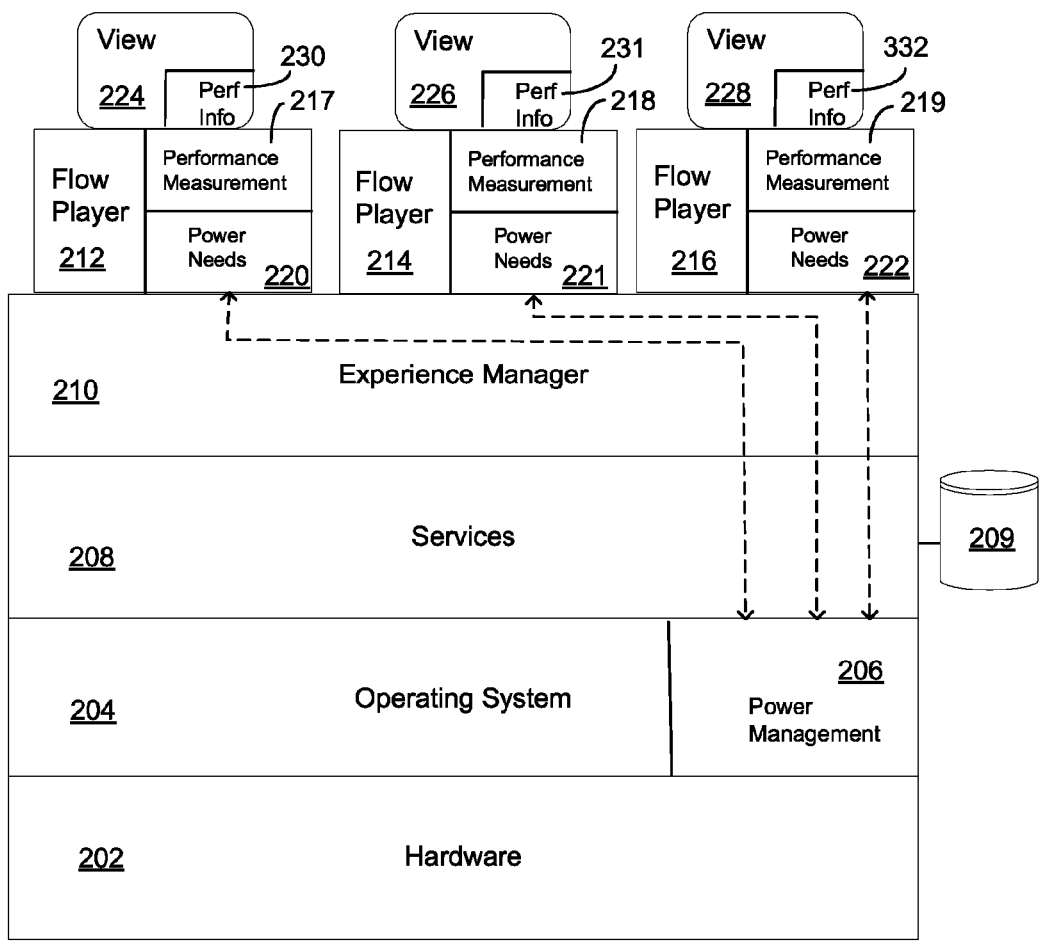
FIG. 2 is a block diagram of an exemplary flow-based architecture suitable for use in a mobile communications device.

FIG. 2 is a block diagram showing an exemplary flow-based architecture 200 suitable for use in a portable communications device (such as device 100 in FIG. 1). With reference now to FIG. 2, an exemplary architecture 200 can be built upon an operating system 204 interacting with device hardware 202 to provide services and display information in response to a services or other abstraction layer 208. Generally speaking, an experience manager 210 application controls user focus and coordinates the actions of one or more flow players 212, 214, 216 operating on the device 100. Each flow player 212, 214, 216 executes, manages or otherwise "plays" a flow, which is a series of views 224, 226, 228 that are presented to the user, typically on display 116 (FIG. 1). The various views 224, 226, 228 are related to other views in the flows being executed by players 212, 214, 216 (respectively).

Hardware 202 includes any physical components in device 100, including controller 104, storage device 106, display driver 118, transceiver 112, input/output devices 110 and/or the like. As noted in the discussion of FIG. 1, controller 104 generally executes instructions and processes data to produce desired results (e.g. presentations on display 116, communications via transceiver 112, and/or the like) in response to inputs from the user.

Operating system 204 is any software capable of managing the operations of hardware 202 and of executing the various functions demanded by other software processes executing within architecture 200. Generally speaking, operating system 204 includes modules or logic for managing such tasks as memory allocation, input and output distribution, interrupt processing, job scheduling and/or the like. Examples of suitable operating systems include any variant of the UNIX operating system, including any version of the LINUX operating system, although other embodiments may use any version of the WINDOWS operating systems available from MICROSOFT CORP. of Redmond, Wash., and/or any other operating system that may be available. Any software and/or firmware capable of providing an interface to any sort of hardware 202 could be used in any number of equivalent embodiments.

Operating system 204 typically includes any number of power management features 206 that are used to manage the power consumption of hardware 202 during operating of device 100. In various embodiments, the power management module 206 is a conventional dynamic voltage and frequency scaling (DVFS) module, although other designs and implementations may make use of other standard or non-standard technologies such as advanced power management (APM), advanced configuration and power interface (ACPI), and or the like. Power management features 206 may include any sort of software driven techniques or the like that are able to change the performance of power-consuming components operating in device 100. Typically, power management module 206 includes software routines that interact with device drivers contained within operating system 204 to reduce power consumption by temporarily idling or otherwise adjusting the performance of one or more components in hardware 202 during times that the disabled component is not needed. The MONTAVISTA PROFESSIONAL EDITION product available from MontaVista Software Inc. of Santa Clara, Calif., for example, is one software product that provides dynamic power management capabilities in portable devices, although any other products or software could be used in other embodiments. Various other techniques have been used, for example, to back bias or threshold adjust certain transistors operating within components of device 100 to conserve power at certain times. Power management module 206 therefore activates and deactivates particular components or modules in hardware 202 in response to instructions received from higher-level software executing within architecture 200.

Services layer 208 is any type of abstraction or intermediary between operating system 204 and the more custom programming residing at the higher levels. In a typical embodiment, services layer 208 provides an interface to operating system 204, as well as a reuseable collection of closely related functions that can be exploited by higher level code to simplify programming. Functions provided by services layer 208 may include routines or interfaces for providing or consuming data used by one or more views in a flow, for example, as well as any other convenient features as desired. Services layer 208 provides a convenience in many embodiments that may not be required in all practical implementations; as such, services layer 208 may be differently organized, partially or wholly incorporated into operating system 204, or even omitted entirely in an equivalent embodiment.

Various embodiments include a database 209 for storing data. Database 209 is any database, data structure and/or other repository capable of maintaining data in any manner that allows for subsequent retrieval. Database 209 does not necessarily require a formal database structure, although conventional database organization, storage and/or query schemes (e.g. structured query language (SQL)) may be used in various embodiments. Database 209 suitably manages the storage of any data used by any higher-level programs within model 200. In the exemplary embodiment of FIG. 2, for example, database 209 is shown on par with the services level 208 to reflect that services layer 208 may provide database storage and retrieval features for accessing data stored in storage device 106 and/or elsewhere. Other embodiments, however, may equivalently incorporate data storage functions into higher software levels and/or may simply use operating system read/write features to manage data storage.

Experience manager 210 is any application, applet, module and/or the like capable of managing the execution of one or more flow players 212, 214, 216 on device 100. In various embodiments, experience manager 210 is a software application that uses the services provided by services layer 208 to manage imagery presented on display 116 (e.g. to control user focus on a desired flow), to distribute events (e.g. inputs, system responses, interrupts and/or the like) occurring within device 100 to the appropriate flows, and/or to process other tasks as appropriate.

As noted above, the user interacts with device 100 via one or more flows. Each flow is presented or otherwise "played" by a flow player 212, 214, 216. Each flow player 212, 214, 216 manages the user experience for a particular flow by sequentially allowing the user to move through a series of screens or views 224, 226, 228 (respectively) that are presented on display 116 as appropriate. Each view 224, 226, 228 is typically a collection of visual objects that are presented on display 116 and that produce or consume data. As the user provides input to device 100 (e.g. via input device 110), for example, the flow player associated with the active view suitably responds to the input with an appropriate action. Actions may include changing a display contained in a view 224, 226, 228, presenting a subsequent view associated with the flow, storing data in database 209 (or elsewhere), processing received data and/or taking any other action as appropriate.

Although views 224, 226, 228 may be implemented in many different ways, in various embodiments views 224, 226, 228 and the other views are implemented with extensible markup language (XML) constructs or the like. XML-based embodiments provide not only convenient syntax for describing the appearance and functions of the various views, but also contain the ability to embed and store custom information, such as information 230-232 about device performance (which is related to power consumption) while the view 224, 226, 228 is active. Further, performance information 230-232 may be measured while any view 224, 226, 228 is active, and this information may be stored with the view 224-228 in database 209 or elsewhere, as described more fully below. Hence, each view 224, 226, 228 is able to store performance information 230, 231, 232 (respectively) indicative of the device performance while the view 224, 226, 228 is active. Other markup languages could be readily used in place of XML constructs in any number of equivalent embodiments.

Figure 3:
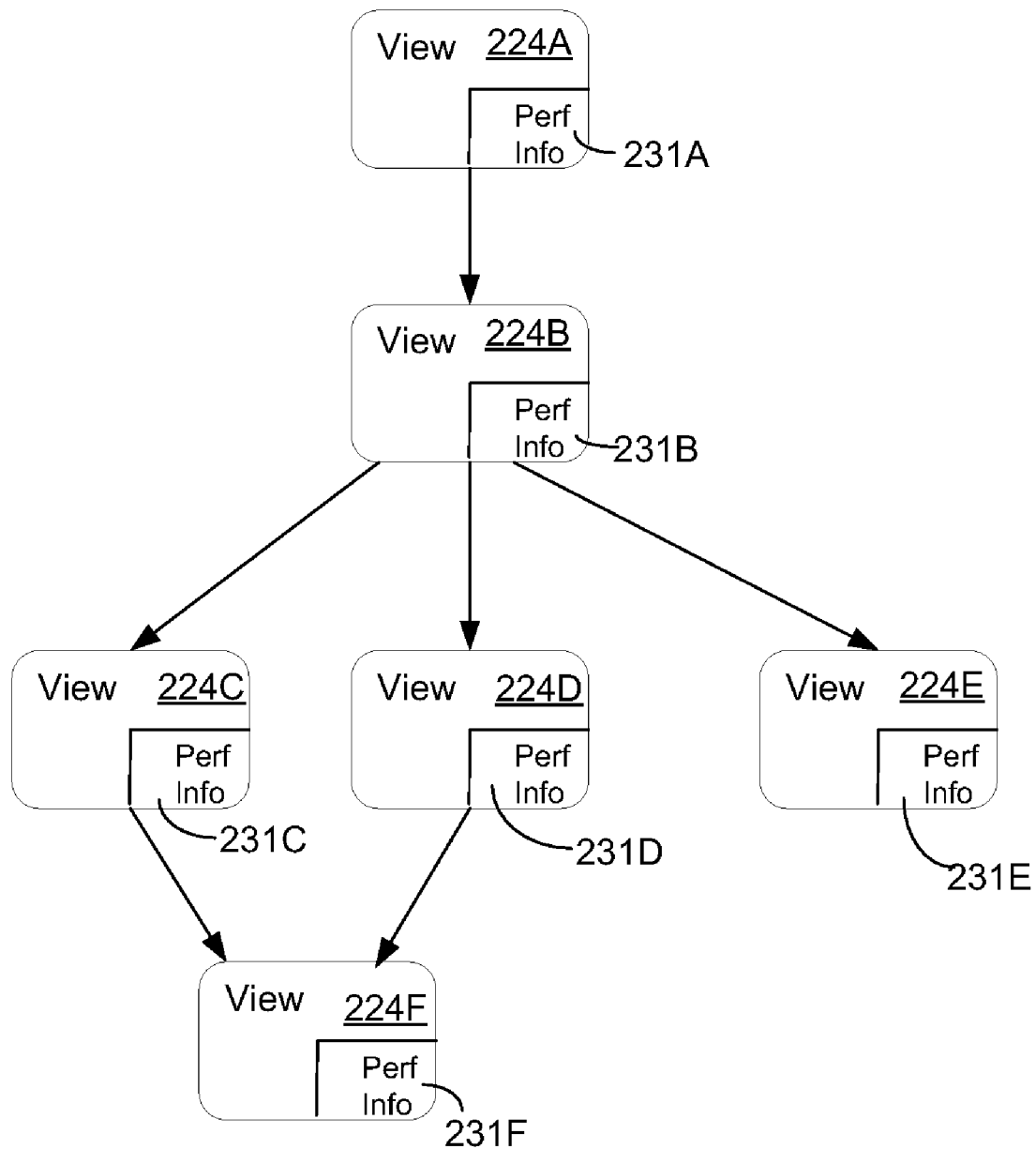
FIG. 3 is a block diagram of an exemplary flow that includes multiple views having power management features.

A flow is typically a collection of linked views (e.g. views 224, 226, 228) that are traversed based upon user and/or system input. Referring momentarily to FIG. 3, an exemplary flow 300 suitably includes any number of inter-related views 224A-F arranged in any logical manner. The various views 224A-F could be arranged serially with respect to each other, and/or may be organized with any branching or tree-type structure, similar to a state arrangement in a conventional state machine architecture. View transitions typically occur in response to user and/or system inputs that instruct the flow player 212, 214, 216 to present a different view to the user. Each view 224A-F, in turn, can provide any sort of data feedback, query space and/or other input/output features as appropriate to carry out the purpose served by the flow 300. Flow 300, then, is any series of inter-related or inter-connected views that can lead a user through an interaction or task to be carried out using device 100.

With primary reference again to FIG. 2, the use of flow players 212, 214, 216 in conjunction with stored performance information 230-232 can significantly improve the power management of device 100 as flow 300 executes. In various embodiments, each flow player 212, 214, 216 obtains performance measurements 217, 218, 219 (respectively) from each view 224A-F as the flow 300 executes. This information may be stored with the particular view 224A-F and subsequently retrieved to determine power needs 220, 221, 222 (respectively) for device 100 while that view is active. That is, power information 220-222 can be relayed to or otherwise used to interact with power management features 206 in the operating system 204 to configure the performance of device 100 at appropriate times, thereby managing the amount of power consumed by the device.

Power information 220-222 may be correlated to the information 230-232 stored with each view 224, 226, 228 in any manner. In various embodiments, performance information 230-232 simply reflects a listing of resources needed (and/or not needed) to effectively execute a particular view or flow. Flow players 212-216 may coordinate this information with power control data 220-222 used to manage power management module 206 as desired. For example, performance information 230-231 can be correlated to DVFS or other instructions that adjust the performance of device 100 to an acceptable level for the particular active view or flow. Performance adjustments may include adjustment of operating frequencies or other parameters of certain components. Other performance adjustments may include, for example, powering down unused resources for the duration of the view and/or flow. Alternately, power data 220-222 can be used to ensure that certain unused modules need not be retrieved from storage 106, or that other actions are taken to reduce power consumption within device 100. Other actions that could be taken include, without limitation, reducing the operating speed of controller 104 or other components when less-demanding flows are active, reducing the level of communication provided by transceiver 112 when non-communicating flows are active, disabling or re-configuring any powered input devices 110 when certain types of inputs are not expected, and/or taking other actions as appropriate.

Alternately, performance information 230-232 may include any other information that represents an acceptable level of functionality. In addition to the information previously described, such information might include any representation of processor usage while the view or flow is active, any listing of modules and/or data sources used (or not used) during execution of the view, and/or any other information as appropriate. Note that the power information features 220-222 may be partially or completely moved from the flow players 212-216 to the experience manager 210 in an equivalent embodiment, and/or experience manager 210 may coordinate the power management information provided by multiple flow players 212-216 to provide a unified and consistent instruction to power management module 206 based upon the view 224, 226, 228 that is currently active on display 116, or based upon any other factors as appropriate.

In operation, then, architecture 200 can be used to dramatically improve the power consumption of device 100. As each view 224A-F in a flow 300 is loaded or otherwise obtained from database 209, performance information 230 previously stored with the view 224 can be retrieved and used to configure operation of device 100 in a manner that allows effective execution of the flow, but that does not consume additional power for unneeded functionality or performance. To that end, flow player 212 typically receives the stored performance information 230 from the view 224, determines a corresponding level of performance, and then inter-communicates with power management module 206 as appropriate to create the desired system configuration that provides adequate performance for the current view 224. Moreover, the performance of device 100 may be measured (module 217-219) during operation so that updated performance information 230 can be stored in database 209 when the view 224 is complete, thereby allowing for dynamic updating of power consumption settings that may change over time, in response to user inputs and/or other factors.

Figure 4:
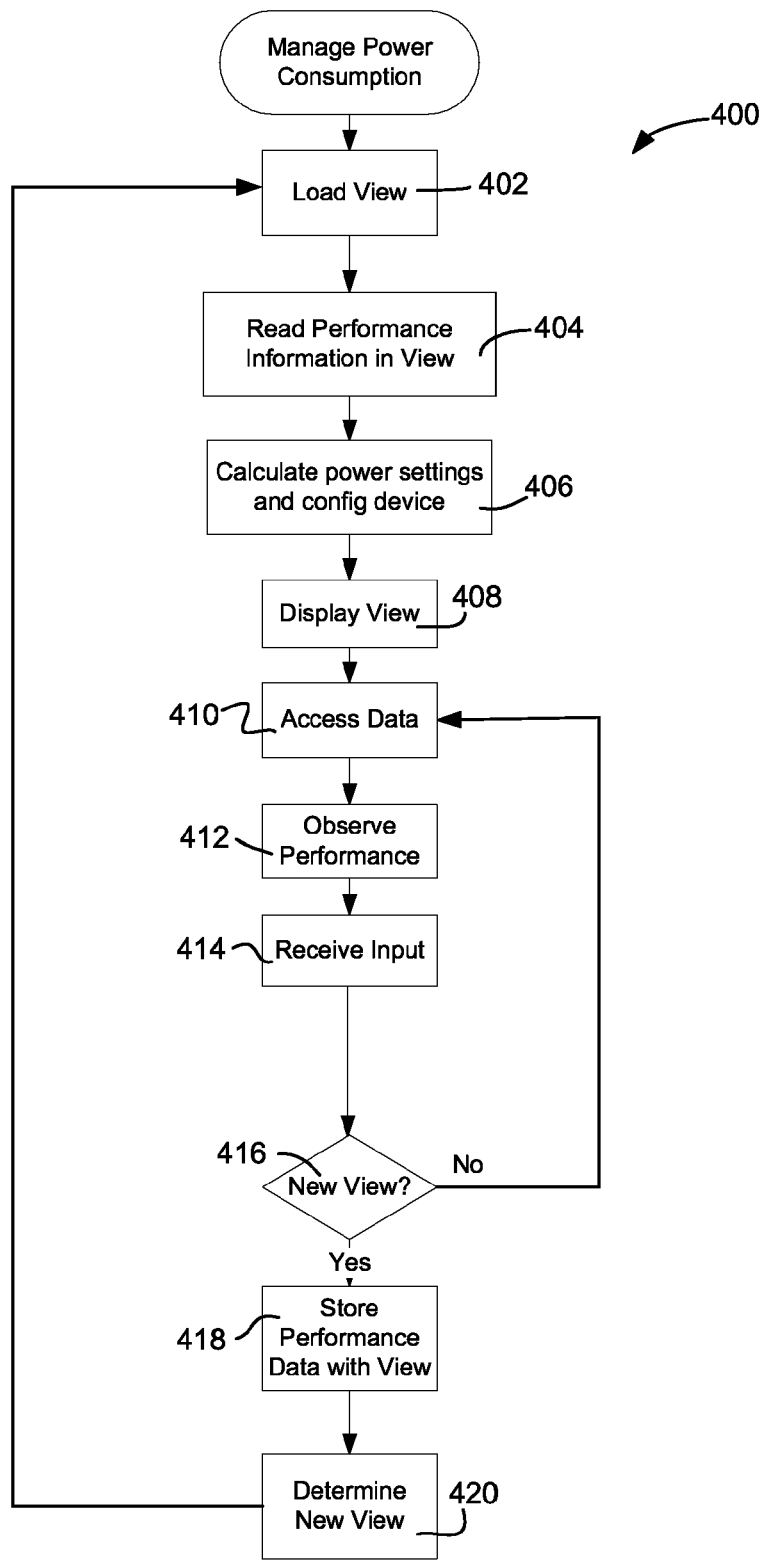
FIG. 4 is a flowchart of an exemplary process for managing power consumption in a flow-based system.

FIG. 4 describes an exemplary process 400 for enacting power management within a flow-based architecture. As shown in FIG. 4, process 400 suitably involves retrieving a series of views 224 from the digital storage device for presentation on display 116 (step 420), determining performance information 230 relating to the portable communications device 100 while the view 224 is displayed (step 412), and then storing the performance information 230 with the view 224 for subsequent retrieval (step 418). Upon subsequent retrieval of the view 224, the portable communications device 100 can be configured (step 406) in response to the stored performance information 230 to set an acceptable level of performance for the device that does not consume excess electrical power from the battery 102, thereby managing the electrical power consumption of the portable communications device. Each of the steps shown in process 400 may be carried out by software or firmware logic executing on controller 104 or elsewhere within device 100. Such logic may be implemented with compiled and/or interpreted source or object code in any language or format that is stored in storage 106 or elsewhere.

In practice, a flow player 212, 214, 216 typically executes process 400 while the flow executes; that is, process 400 will execute for each view 224A-F in a flow. The process 400 in FIG. 4 is therefore shown as non-terminating in that the process as illustrated generally repeats until terminated by an interrupt or other external factor. Other embodiments, however, may execute some or all of process 400 in experience manager 210, services layer 208 and/or operating system 204. Further, process 400 is shown in FIG. 4 as beginning with step 402 for convenience. In practice, however, the various steps shown in FIG. 4 may be modified, enhanced, differently organized and/or differently arranged in any manner. Similarly, the hardware, software and/or other logic modules assigned to carry out the various tasks shown in FIG. 4 may be combined or otherwise differently arranged in any number of alternate but equivalent embodiments.

In the exemplary embodiment shown in FIG. 4, process 400 suitably begins by loading a view 224 from storage or otherwise retrieving a view 224 for presentation on display 116. As the view 224 is retrieved, performance information 230 is obtained about the view 224 as appropriate (step 404). This step 4 may involve simply retrieving performance information 230 from a view 224 that is being retrieved (or that has just been retrieved) from database 209 and/or other storage. In this embodiment, the stored information 230 is received at flow player 212 as performance information 217, which in turn can be correlated to power consumption information 220 in any manner (step 406). For example, the performance information 230 stored with view 224 can be used to generate DVFS settings or other parameters. In various embodiments, these parameters are represented by power consumption information 220 in flow player 212 or the like. This power consumption information 220, in turn, can be provided to power management module 206 to configure and manage the operation of device 100 while the view 224 is presented on display 116 (step 408) and/or while the flow 300 remains active.

In many embodiments, the power consumed by device 100 is heavily influenced by the resources used or consumed by the active flow 300. Certain flows that have relatively intense processing demands, input/output requirements, or other interactions between hardware components in device 100, for example, will typically consume more power during execution than flows 300 that have relatively low processing requirements and/or that do not make significant use of input/output features, data transfers to or from memory, or the like. One way to monitor the performance of device 100 during display of any particular view 224, then, involves observing performance as the view 224 accesses various sources of data. As the view 224 accesses a data source (e.g. a library or other resource, as represented by step 410), system performance can be monitored to see if performance deadlines are being met, missed or exceeded (step 412). These performance deadlines are typically, but not limited to, time-based goals for executing any particular task, and will vary significantly from embodiment to embodiment. In other embodiments, any sort of measurement could be made as to the performance needed to execute the view 224 (or the flow 300). Measurements could be taken as to processor cycles needed to complete a task, for example, or whether the view makes use of input/output devices 110, wireless transceiver 112, storage 106 and/or other resources as appropriate.

The measurements and/or observations taken during step 412 can be correlated to performance information 230 stored with view 224 in any manner. In various embodiments, stored performance information 230 could simply incorporate any representation of parameters used during execution, along with a representation of whether the parameters provided results that were acceptable, too fast, too slow, or the like. In other embodiments, performance information may incorporate any listing of data sources for which the view 224 needs access. That is, if information 230 contains a listing of resources used (or not used) by the particular view 224, then unused resources can be powered down or otherwise placed in a less consumptive state upon subsequent executions of view 224. In other embodiments, additional information about the power consumption and/or performance demanded by view 224 could be maintained in information 230 as well. That is, information 230 may contain any indicia of an operating parameter (e.g. a desired clock speed) of any component, data source and/or other resource available to view 224. Step 412, then, suitably involves observing the results obtained during actual execution of view 224 to facilitate subsequent storage of performance information 230.

When the flow player changes views (step 416) in response to user or system inputs received (step 414), the power management information obtained in step 412 and/or elsewhere in process 400 is suitably stored as information 230 (step 418). This information may be written to database 209 or other storage 106 in any manner, and stored for later retrieval and use during a subsequent execution of view 224. After flow 224 is complete and the relevant power/performance information 230 is stored, process 400 suitably obtains the next view for display (step 420), and the process continues with new power management information obtained from the new view (step 402).

Process 400 may be enhanced or modified in many ways. For example, flow player 224 may retain performance/power information 230 for two or more views 224 in a common flow 300 to allow for a more integrated approach to power management. Similarly, experience manager 210 may maintain such information for multiple flows that may be executing concurrently on device 100. Again, process 400 may be modified, supplemented and/or differently arranged in any manner.

By maintaining performance information 230 (e.g. lists of accessed resources and/or parameters for those resources) in each view 224A-F in a flow 300, then, the overall power management of a device 100 can be dramatically improved without significant adverse impact upon device performance. Because resource information can be gathered under current and actual operating conditions, the resulting can be very reliable. Moreover, because the performance information can be updated during subsequent executions of each view, changes in power consumption due to differing user inputs, operating conditions and/or other factors can be readily accepted. This provides a significant advantage over many conventional approaches wherein power consumption information is typically "hard coded" into the executing software. Moreover, through convenient XML or similar structures, the performance information may be stored with the view itself, thereby providing ready access to such information during subsequent operation.

As noted at the outset, the exemplary embodiments described herein are only examples, and are not intended to limit the scope, applicability, or configuration of the inventions in any way. Rather, the foregoing detailed description will provide those skilled in the art with a convenient road map for implementing one or more exemplary embodiments. Various changes may be made in the function and arrangement of elements described above without departing from the scope of the invention as set forth in the appended claims and their legal equivalents.

What is claimed is:

1. A method for managing electrical power consumption in a portable communications device having a battery, a digital storage medium and a display, the method comprising the steps of:

retrieving a series of views from the digital storage device for presentation on the display;

for each of the series of views retrieved from the digital storage device, determining performance information relating to the performance of the portable communications device while the view accesses resources of the portable communications device, and then storing the determined performance information for the view in the digital storage medium; and upon subsequent retrieval of each view from the digital storage medium, powering down at least some of the resources not used by the view in response to the previously-stored performance information to thereby manage the electrical power consumption of the portable communications device.

2. The method of claim 1 wherein the performance information comprises a representation of a minimum power level that achieves an expected level of quality.

3. The method of claim 1 wherein the performance information comprises a representation of processor usage.

4. The method of claim 1 wherein the performance information comprises at least one of a listing of modules used by the view and a listing of modules not used by the view.

5. The method of claim 1 wherein the performance information comprises at least one of a listing of data sources accessed by the view and a listing of data sources not accessed by the view.

6. The method of claim 1 wherein the series of views are inter-related in a predetermined manner to form a flow.

7. The method of claim 1 wherein the performance information comprises at least one of a listing of resources used by the view and a listing of resources not used by the view.

8. A system for managing electrical power consumption in a portable communications device having a battery and a display, the system comprising:
a database comprising a plurality of views, wherein each of the views is configured to produce an image on the display and has an associated data field configured for storing performance information about the performance of the portable communications device when the view is active, wherein the performance information comprises at least one of a listing of resources used by the view and a listing of resources not used by the view; and
a flow player configured to retrieve a series of the views from the database to thereby form a flow, to produce the image associated with each view on the display, to measure the performance information for each of the views while each view is active and to store each view with the associated data fields in the database when the view is complete; and
a power management module configured to communicate with the flow player and to configure the portable communications device in response to the performance information associated with the current view to thereby manage electrical power consumption in the portable communications device, wherein the power management module is configured to power down at least some of the resources not used by the view when the view is subsequently active.

9. The system of claim 8 wherein the flow player is further configured to process the performance information obtained from the view and to provide an instruction to the power management module based upon the performance information.

10. The system of claim 8, wherein the power management module is configured to communicate with the flow player to thereby adjust a performance level of the portable communications device in response to the performance information associated with the current view.

11. The system of claim 10 wherein the power management module is a dynamic voltage and frequency scaling module.

12. The system of claim 8 further comprising an experience manager configured for managing the execution of the flow player on the portable communications device.

13. The system of claim 12 further comprising a second flow player that is managed by the experience manager to execute a second flow formed by a second series of the views stored in the database.

14. The system of claim 13 further comprising an operating system having a power management module configured to adjust an amount of power from the battery that is consumed by the portable communications device.

15. The system of claim 14 wherein the power management module is configured to communicate with the flow player and the second flow player via the experience manager to thereby adjust the amount of power in response to the performance information associated with at least one of the current views.

16. The system of claim 15 wherein the experience manager is further configured to adjust the amount of power consumed by the portable communications device in response to the predicted consumption of power.

17. A portable communications device comprising:
a battery configured to provide electric power;
a user input device configured to receive user inputs;
a display configured to receive a portion of the electric power from the battery;
a digital storage device configured to receive a second portion of the electric power from the battery and to store a plurality of views, wherein each view comprises an image for presentation on the display; and
a controller configured to receive a third portion of the electric power from the digital storage device and to present a series of views forming a flow on the display in response to user inputs received from the input device, wherein the controller is further configured to determine performance information about the portable communications device while each view is active, to store the performance information with the view on the digital storage device, and, upon subsequent retrieval of the view from the digital storage device, to configure the portable communications device in response to the stored performance information to thereby power down at least some of the resources of the portable communications device that are not used by the view when the view is subsequently active and to thereby manage the amount of electric power provided by the battery.

18. The device of claim 17 wherein the portable communications device is selected from the group consisting of a mobile telephone, a portable computer and a personal digital assistant.

* * * * *